United States Patent
Komada

(10) Patent No.: US 11,807,763 B2
(45) Date of Patent: *Nov. 7, 2023

(54) INKJET INK

(71) Applicant: KYOCERA Document Solutions Inc., Osaka (JP)

(72) Inventor: Ryotaro Komada, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 320 days.

This patent is subject to a terminal disclaimer.

(21) Appl. No.: 17/092,600

(22) Filed: Nov. 9, 2020

(65) Prior Publication Data

US 2021/0139725 A1   May 13, 2021

(30) Foreign Application Priority Data

Nov. 13, 2019 (JP) ................................ 2019-205496

(51) Int. Cl.
| | | |
|---|---|---|
| *C09D 11/328* | (2014.01) | |
| *C09D 11/36* | (2014.01) | |
| *C09D 11/033* | (2014.01) | |
| *D06P 1/52* | (2006.01) | |
| *C09D 11/104* | (2014.01) | |
| *D06P 5/30* | (2006.01) | |
| *C09D 11/037* | (2014.01) | |
| *C09D 11/38* | (2014.01) | |
| *D06P 1/00* | (2006.01) | |
| *D06P 1/41* | (2006.01) | |
| *C09D 11/30* | (2014.01) | |
| *C08G 63/688* | (2006.01) | |

(52) U.S. Cl.
CPC ........ *C09D 11/328* (2013.01); *C08G 63/6886* (2013.01); *C09D 11/033* (2013.01); *C09D 11/037* (2013.01); *C09D 11/104* (2013.01); *C09D 11/30* (2013.01); *C09D 11/36* (2013.01); *C09D 11/38* (2013.01); *D06P 1/0016* (2013.01); *D06P 1/0028* (2013.01); *D06P 1/41* (2013.01); *D06P 1/5271* (2013.01); *D06P 5/30* (2013.01)

(58) Field of Classification Search
CPC .. C08G 63/6886; C09D 11/328; C09D 11/36; C09D 11/033; C09D 11/104; C09D 11/037; C09D 11/38; C09D 11/30; D06P 1/5271; D06P 5/30; D06P 1/0016; D06P 1/0028; D06P 1/41

See application file for complete search history.

(56) References Cited

U.S. PATENT DOCUMENTS

| | | | |
|---|---|---|---|
| 4,623,689 | A | 11/1986 | Shintani et al. |
| 7,432,315 | B2 | 10/2008 | Kamoto et al. |
| 2004/0059020 | A1 | 3/2004 | Kamoto et al. |

FOREIGN PATENT DOCUMENTS

| | | | |
|---|---|---|---|
| CN | 1511899 A | | 7/2004 |
| EP | 0864437 | * | 9/1998 |
| JP | S60-38481 A | | 2/1985 |

OTHER PUBLICATIONS

An Office Action mailed by China National Intellectual Property Administration dated May 31, 2022, which corresponds to Chinese Patent Application No. 202011243624.8 and is related to U.S. Appl. No. 17/092,600; with English language translation.

Cihai: Engineering Technology Volume, The Chinese Dictionary, Publisher: Shanghai Lexicographical Publishing House, 1st edition, Dec. 31, 1987, p. 974.

* cited by examiner

*Primary Examiner* — Patrick D Niland
(74) *Attorney, Agent, or Firm* — Studebaker & Brackett PC

(57) ABSTRACT

Composite particles contained in an ink are particles of a composite of a polyester resin including a sulfonic acid group and a basic dye. The polyester resin has a glass transition point of 40° C. to 70° C. The polyester resin includes a first repeating unit derived from a polyvalent carboxylic acid having the sulfonic acid group, a second repeating unit derived from a polyvalent carboxylic acid having no sulfonic acid group, and a third repeating unit derived from a polyhydric alcohol. The content ratio of the first repeating unit relative to the total amount of the first repeating unit and the second repeating unit is at least 1.5 mol % and no greater than 20.0 mol %. The mass ratio of the polyester resin to the basic dye is at least 1.0 and no greater than 10.0.

2 Claims, No Drawings

INKJET INK

INCORPORATION BY REFERENCE

The present application claims priority under 35 U.S.C. § 119 to Japanese Patent Application No. 2019-205496, filed on Nov. 13, 2019. The contents of this application are incorporated herein by reference in their entirety.

BACKGROUND

The present disclosure relates to an inkjet ink.

An inkjet ink is ejected from a recording head of an inkjet recording apparatus to print an image on a recording medium. For example, a known inkjet ink contains polymer particles. The polymer particles are obtained by dyeing particles of a copolymer of an ethylenically unsaturated sulfonic acid or a salt thereof and another ethylenically unsaturated monomer with a basic dye.

SUMMARY

An inkjet ink according to an aspect of the present disclosure contains an aqueous medium and composite particles. The composite particles are particles of a composite of a polyester resin having a sulfonic acid group and a basic dye. The glass transition point of the polyester resin is 40° C. or higher and 70° C. or lower. The polyester resin includes a first repeating unit derived from a polyvalent carboxylic acid having the sulfonic acid group, a second repeating unit derived from a polyvalent carboxylic acid having no sulfonic acid group, and a third repeating unit derived from a polyhydric alcohol. The content ratio of the first repeating unit relative to a total amount of the first repeating unit and the second repeating unit is at least 1.5 mol % and no greater than 20.0 mol %. The mass ratio of the polyester resin to the basic dye is at least 1.0 and no greater than 10.0.

DETAILED DESCRIPTION

In the following description, the term "-based" may be appended to the name of a chemical compound in order to form a generic name encompassing both the chemical compound itself and derivatives thereof. Also, when the term "-based" is appended to the name of a chemical compound used in the name of a polymer, the term indicates that a repeating unit of the polymer originates from the chemical compound or a derivative thereof. The term "at least one of . . . and . . . " indicates "at least one selected from the group consisting of . . . and . . . ".

[Inkjet Ink]

The following describes an inkjet ink (referred to below as an ink) of an embodiment of the present disclosure. The ink of the present embodiment can be used as for example an ink for digital textile printing by which an image is printed on a textile product such as cloth using an inkjet recording apparatus. The digital textile printing has advantages over screen printing and rotary screen printing in that a process of removing a sizing agent is unnecessary and that dyeing wastewater can be reduced.

The ink of the present embodiment contains an aqueous medium and composite particles. The ink of the present embodiment is an aqueous ink containing an aqueous medium. As a result of the ink containing composite particles, it is possible to print an image having few image defects, excellent fastness to rubbing, and less impaired touch. The following describes the composite particles and the aqueous medium.

<Composite Particles>

The composite particles are particles of a composite of a polyester resin having a sulfonic acid group and a basic dye. In the composite particles, the basic dye and the sulfonic acid group of the polyester resin are bonded by for example an ionic bond. The basic dye has a basic group, and the basic group becomes a cationic group in an aqueous medium. A cationic group (for example, $-NH_4^+$) formed from the basic group (for example, an amino group) in the basic dye and an anionic group ($-SO_3^-$) formed from the sulfonic acid group of the polyester resin bind with each other by an ionic bond. By such an ionic bond, the basic dye and the sulfonic acid group of the polyester resin are firmly bonded to form a composite.

As a result of the ink containing the composite particles, the following advantages are obtained. When the ink containing the composite particles lands on a recording medium (for example, a textile product such as polyester cloth or cotton cloth) and is heat-treated, the polyester resin plastically deforms on the recording medium and the composite particles also undergo plastic deformation. Since the plastically deformed composite particles spread on the surface of the recording medium, an image having a high image density can be printed even when a small amount of the ink is used. In addition, unlike bleeding of a dye that spreads along fibers of the recording medium due to capillary action, the dyed area extends due to plastic deformation of the composite particles, resulting in a clear image printed using the ink containing the composite particles. Further, when the ink containing the composite particles lands on a recording medium, the recording medium and the composite particles adhere to each other through the polyester resin contained in the composite particles, resulting in an improved fastness to rubbing of the image.

(Resin/Dye Ratio)

The mass ratio of the polyester resin to the basic dye is at least 1.0 and no greater than 10.0. The "mass ratio of the polyester resin to the basic dye" may be referred to below as the "resin/dye ratio".

When the resin/dye ratio is less than 1.0, the amount of the polyester resin is small. As a result, when the ink containing the composite particles lands on a recording medium, it is difficult for the recording medium and the composite particles to adhere to each other, leading to a lowered fastness to rubbing. Further, when the resin/dye ratio is less than 1.0, the amount of the basic dye is large. As a result, it is difficult to introduce the basic dye into the polyester resin, leading to difficulty in preparation of the composite particles.

On the other hand, when the resin/dye ratio is greater than 10.0, the amount of the basic dye is small. As a result, the density of a printed image may be lowered, and an image defect such as uneven density may occur. Further, when the resin/dye ratio is greater than 10.0, the amount of the polyester resin is large. As a result, an image printed on a recording medium using the ink containing the composite particles may have stiffness due to the presence of the polyester resin, which may lead to deterioration in touch (for example, swelling resistance and resilience). In addition, when the resin/dye ratio is greater than 10.0, the amount of the polyester resin is large. As a result, an image printed on the recording medium using the ink containing the composite particles may have sliminess in the presence of the polyester resin, which may lead to deterioration in touch.

Further, when the resin/dye ratio is greater than 10.0, the fastness to rubbing may also decrease.

In order to print an image with few image defects, excellent fastness to rubbing, and less impaired touch, the resin/dye ratio is preferably at least 1.0 and no greater than 5.0, and more preferably at least 1.0 and no greater than 3.0.

The resin/dye ratio can be changed by changing the amount of the polyester resin and the amount of the basic dye added in preparation of the composite particles.

(Specific Conductivity)

A conductivity of a dispersion obtained by dispersing the composite particles in water at a concentration of 10% by mass is preferably no greater than 30 µS/cm. The "conductivity of a dispersion obtained by dispersing the composite particles in water at a concentration of 10% by mass" may be referred to below as a "specific conductivity". The specific conductivity of the composite particles serves as an index indicating an amount of counterions contained in the basic dye forming the composite particles. The lower the specific conductivity of the composite particles, the smaller the amount of counterions contained in the basic dye.

Basic dyes are usually produced by salting out, and therefore, the basic dyes often contain counterions (for example, $Cl^-$, $SO_4^-$, $PO_4^-$, and $CO_3^-$). Counterions stabilize the dye in water. However, when an ink contains counterions, inorganic salt impurities (for example, NaCl, $Na_2SO_4$, $Na_2PO_4$, and $CaCO_3$) may be generated from the counterions. The generated inorganic salt impurities may adhere to the inside of the nozzles of a recording head of an inkjet recording apparatus, causing nozzle clogging and irregular ink ejection from the nozzles.

When the specific conductivity of the composite particles is no greater than 30 µS/cm, counterions contained in the basic dye are reduced to an amount equal to or less than a desired value. For this reason, the amount of generated inorganic salt impurities is reduced, and nozzle clogging and irregular ink ejection from the nozzles can be inhibited. As a result, occurrence of image defects such as image streaks due to such nozzle clogging or irregular ink ejection can be inhibited.

In order to inhibit nozzle clogging and irregular ink ejection from the nozzles, the specific conductivity of the composite particles is preferably no greater than 15 µS/cm, and more preferably no greater than 10 µS/cm. The lower limit of the specific conductivity of the composite particles is not particularly limited, but the specific conductivity of the composite particles is for example at least 0 µS/cm.

An example of a method for adjusting the specific conductivity of the composite particles is a washing treatment of the composite particles with water (for example, ion exchange water). The larger the number of times of the washing treatment, the lower the specific conductivity of the composite particles. Details of the washing treatment will be described in [Ink Production Method] below and in <Preparation of Composite Particles (C-a)> described in Examples below. Another example of the method for adjusting the specific conductivity of the composite particles is a method of dehydrating the composite particles using a centrifuge. Another example of the method for adjusting the specific conductivity of the composite particles is a method of purifying the composite particles using an ultrafiltration membrane, a reverse osmosis membrane, or an ion exchange resin. The specific conductivity of the composite particles can be measured by a method described in Examples below.

The content ratio of the composite particles is preferably at least 0.1% by mass and no greater than 30.0% by mass relative to the mass of the ink, and more preferably at least 0.1% by mass and no greater than 10.0% by mass.

(Polyester Resin Forming Composite Particles)

The polyester resin forming the composite particles has a sulfonic acid group. As a result of the polyester resin having a sulfonic acid group, the polyester resin and the basic dye having a basic group (for example, an amino group) are firmly bonded to form a composite. The sulfonic acid group of the polyester resin in the composite particles may be present in a salt state.

The polyester resin includes a first repeating unit, a second repeating unit, and a third repeating unit. The first repeating unit is a repeating unit derived from a polyvalent carboxylic acid having a sulfonic acid group. The second repeating unit is a repeating unit derived from a polyvalent carboxylic acid having no sulfonic acid group. The third repeating unit is a repeating unit derived from a polyhydric alcohol.

The polyester resin is obtainable by condensation polymerization of a first monomer, a second monomer, and a third monomer. That is, the polyester resin is a condensation polymer of the first monomer, the second monomer, and the third monomer. The first monomer is a polycarboxylic acid having a sulfonic acid group. The second monomer is a polycarboxylic acid having no sulfonic acid group. The third monomer is a polyhydric alcohol. As a result of the condensation polymerization, the first repeating unit, the second repeating unit, and the third repeating unit are formed from the first monomer, the second monomer, and the third monomer, respectively. That is, the first repeating unit, the second repeating unit, and the third repeating unit are a repeating unit derived from the first monomer, a repeating unit derived from the second monomer, and a repeating unit derived from the third monomer, respectively.

The content ratio of the first repeating unit relative to the total amount (total amount of substances) of the first repeating unit and the second repeating unit is at least 1.5 mol % and no greater than 20.0 mol %. The "content ratio of the first repeating unit relative to the total amount of the first repeating unit and the second repeating unit" may be referred to below as a "first repeating unit ratio".

The sulfonic acid group of the first repeating unit imparts water solubility to the polyester resin. When the first repeating unit ratio is less than 1.5 mol %, the number of sulfonic acid groups is lowered, leading to low water solubility of the polyester resin. In this case, preparation of the composite particles is difficult. Further, when the first repeating unit ratio is less than 1.5 mol %, compatibility of the polyester resin with the aqueous medium is lowered. In this case, dispersibility of the composite particles containing the polyester resin in the ink is decreased.

On the other hand, when the first repeating unit ratio is greater than 20.0 mol %, the solubility of the polyester resin in water is too high. As a result, an image printed using the ink containing the composite particles has a lowered water resistance, leading to a lowered fastness to rubbing (particularly, fastness to rubbing measured by wet testing) is lowered.

In order to print an image having few image defects, excellent fastness to rubbing, and less impaired touch, the first repeating unit ratio is preferably at least 5.0 mol % and no greater than 20.0 mol %, and more preferably at least 5.0 mol % and no greater than 15.0 mol %.

The first repeating unit ratio can be changed by for example changing the amount of the first monomer and the amount of the second monomer added in condensation polymerization of the polyester resin. The first repeating unit ratio can be measured by for example analyzing the polyester resin using a nuclear magnetic resonance (NMR) apparatus to obtain a ratio of a peak unique to the first repeating unit to a peak unique to the second repeating unit.

Examples of the first monomer for forming the first repeating unit include a dibasic carboxylic acid having a sulfonic acid group. Examples of the dibasic carboxylic acid having a sulfonic acid group include sulfoterephthalic acid, 5-sulfoisophthalic acid, 4-sulfophthalic acid, 4-sulfonaphthalene-2,7-dicarboxylic acid, and 5-(4-sulfophenoxy) isophthalic acid, and salts thereof. Examples of the salts include alkali metal salts (specific examples include lithium salts, sodium salts, and potassium salts), magnesium salts, calcium salts, copper salts, iron salts, and ammonium salts.

The first monomer is preferably at least one of 5-sulfoisophthalic acid, a salt of 5-sulfoisophthalic acid, 4-sulfophthalic acid, and a salt of 4-sulfophthalic acid. Further, the first repeating unit preferably includes at least one of a repeating unit derived from 5-sulfoisophthalic acid, a repeating unit derived from a salt of 5-sulfoisophthalic acid, a repeating unit derived from 4-sulfophthalic acid, and a repeating unit derived from a salt of 4-sulfophthalic acid.

The first monomer is more preferably at least one of sodium-5-sulfoisophthalate (also referred to as 5-sulfoisophthalic acid monosodium salt) and 4-sulfophthalic acid. Further, the first repeating unit more preferably includes at least one of a repeating unit derived from sodium-5-sulfoisophthalate and a repeating unit derived from 4-sulfophthalic acid. The repeating unit derived from sodium-5-sulfoisophthalate is represented by the following chemical formula (1A). The repeating unit derived from 4-sulfoisophthalic acid is represented by the following chemical formula (1B).

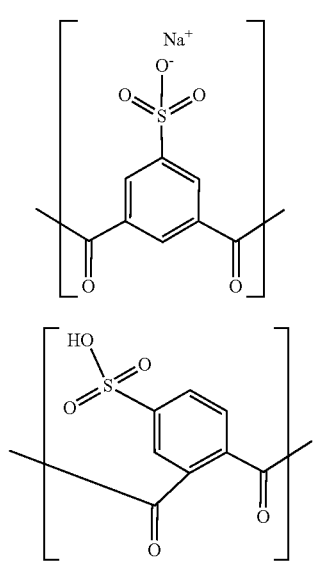

Examples of the second monomer for forming the second repeating unit include an aromatic dibasic carboxylic acid having no sulfonic acid group, an aliphatic dibasic carboxylic acid having no sulfonic acid group, an alicyclic dibasic carboxylic acid having no sulfonic acid group, and a tri- or higher-basic carboxylic acid having no sulfonic acid group. Examples of the aromatic dibasic carboxylic acid having no sulfonic acid group include terephthalic acid, isophthalic acid, naphthalenedicarboxylic acid (for example, 1,5-naphthalenedicarboxylic acid and 2,6-naphthalenedicarboxylic acid), diphenic acid, and phenylenediacrylic acid. Examples of the aliphatic dicarboxylic acid having no sulfonic acid group include succinic acid, adipic acid, azelaic acid, sebacic acid, dodecanedicarboxylic acid, fumaric acid, maleic acid, itaconic acid, mesaconic acid, and citraconic acid. Examples of the alicyclic dibasic carboxylic acid having no sulfonic acid group include cyclohexanedicarboxylic acid. Examples of the tri- or higher-basic carboxylic acid having no sulfonic acid group include trimellitic acid, trimesic acid, and pyromellitic acid.

The second monomer is preferably an aromatic dibasic carboxylic acid having no sulfonic acid group, and more preferably terephthalic acid, isophthalic acid, or naphthalenedicarboxylic acid.

The repeating unit derived from terephthalic acid is represented by the following chemical formula (2A). The repeating unit derived from isophthalic acid is represented by the following chemical formula (2B). The repeating unit derived from naphthalenedicarboxylic acid is preferably represented by the following chemical formula (2C), and is more preferably represented by the following chemical formula (2D).

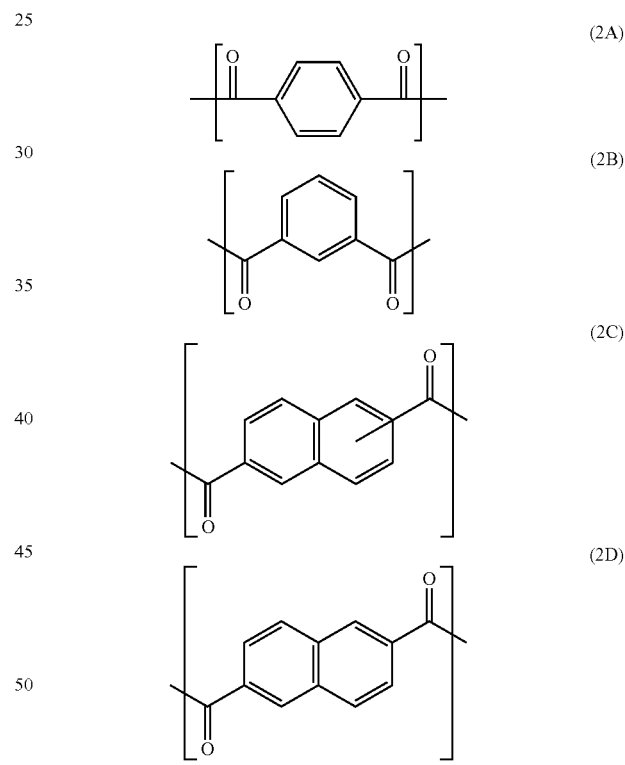

In order to adjust the glass transition point of the polyester resin to 70° C. or lower and to adjust the number average molecular weight of the polyester resin to no greater than 30,000, the second monomer preferably contains terephthalic acid and isophthalic acid and does not contain naphthalenedicarboxylic acid. For the same reason, the second repeating unit preferably includes a repeating unit derived from terephthalic acid and a repeating unit derived from isophthalic acid and does not contain a repeating unit derived from naphthalenedicarboxylic acid.

In order to adjust the glass transition point of the polyester resin to no higher than 70° C. and to adjust the number average molecular weight of the polyester resin to no greater than 30,000, it is also preferable that the second monomer contains terephthalic acid, isophthalic acid, and naphthalenedicarboxylic acid with the proviso that the content ratio of the naphthalenedicarboxylic acid relative to the total amount of the first monomer and the second monomer is greater than 0.0 mol % and no greater than 10.0 mol %. For the same reason, the second repeating unit preferably includes a repeating unit derived from terephthalic acid, a repeating unit derived from isophthalic acid, and a repeating unit derived from naphthalenedicarboxylic acid with the proviso that the content ratio of the repeating unit derived from naphthalenedicarboxylic acid relative to the total amount of the first repeating unit and the second repeating unit is greater than 0.0 mol % and no greater than 10.0 mol %.

Examples of the third monomer for forming the third repeating unit include an aliphatic polyhydric alcohol, an alicyclic polyhydric alcohol, an aromatic polyhydric alcohol, and other polyhydric alcohols. An aliphatic polyhydric alcohol is an aliphatic dihydric alcohol or an aliphatic tri- or higher-hydric alcohol. Examples of the aliphatic dihydric alcohol include ethylene glycol, diethylene glycol, propylene glycol, 1,3-propanediol, 2,3-butanediol, 1,4-butanediol, 1,5-pentanediol, 1,6-hexanediol, neopentyl glycol, dimethylolheptane, dipropylene glycol, 2,2,4-trimethyl-1,3-pentanediol, polyethylene glycol, polypropylene glycol, and polytetramethylene glycol. Examples of the aliphatic tri- or higher-hydric alcohol include trimethylolethane, trimethylolpropane, glycerin, and pentaerythritol. Examples of the alicyclic polyhydric alcohol include 1,4-cyclohexanediol, 1,4-cyclohexanedimethanol, spiroglycol, tricyclodecanediol, tricyclodecanedimethanol, hydrogenated bisphenol A, hydrogenated bisphenol A ethylene oxide adduct, and hydrogenated bisphenol A propylene oxide adduct. Examples of the aromatic polyhydric alcohol include bisphenol A, bisphenol A ethylene oxide adduct, bisphenol A propylene oxide adduct, paraxylene glycol, metaxylene glycol, orthoxylene glycol, 1,4-phenylene glycol, and 1,4-phenylene glycol ethylene oxide adduct. Examples of the other polyhydric alcohols include lactone-based polyester polyols obtained by ring-opening polymerization of lactones such as ε-caprolactone.

The third monomer is preferably an aliphatic polyhydric alcohol or an aromatic polyhydric alcohol. The aliphatic polyhydric alcohol is preferably an aliphatic dihydric alcohol, and more preferably ethylene glycol or diethylene glycol. The aromatic polyhydric alcohol is preferably bisphenol A or a bisphenol A alkylene oxide adduct, more preferably bisphenol A, bisphenol A ethylene oxide adduct, or bisphenol A propylene oxide adduct, and still more preferably bisphenol A propylene oxide adduct. A preferable example of the repeating unit derived from a bisphenol A alkylene oxide adduct, the repeating unit being the third repeating unit, is represented by the following general formula (3A).

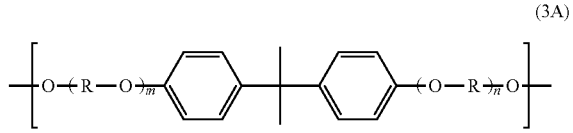

(3A)

In general formula (3A), each R represents a linear or branched alkylene group, m represents an integer of at least 0, n represents an integer of at least 0, and the sum of m and n is at least 2 and no greater than 6. Each R represents preferably a linear or branched alkylene group having a carbon number of at least 2 and no greater than 4, more preferably an ethylene group or a propylene group, and still more preferably a propylene group. The sum of m and n is preferably 2.

In order to adjust the glass transition point of the polyester resin to 40° C. or higher and adjust the number average molecular weight of the polyester resin to at least 2,500, the third monomer preferably contains ethylene glycol and bisphenol A propylene oxide adduct and does not contain diethylene glycol. For the same reason, the third repeating unit preferably includes a repeating unit derived from ethylene glycol and a repeating unit derived from bisphenol A propylene oxide adduct and does not include a repeating unit derived from diethylene glycol. For the same reason, the third monomer preferably does not contain polyethylene glycol, and the third repeating unit preferably contains no repeating unit derived from polyethylene glycol. The repeating unit derived from ethylene glycol is represented by the following chemical formula (3B). The repeating unit derived from diethylene glycol is represented by the following chemical formula (3C).

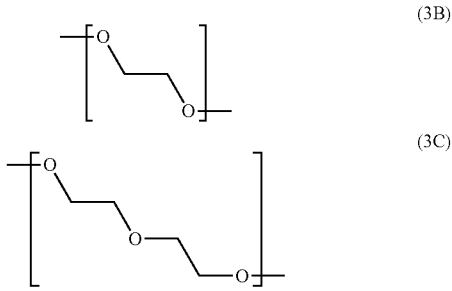

The glass transition point of the polyester resin is 40° C. or higher and 70° C. or lower. As a result of the polyester resin having such a glass transition point, the composite particles plastically deform favorably on a recording medium when an ink containing composite particles lands on the recording medium and is heat-treated. The plastically deformed composite particles spread on the surface of the recording medium, and therefore, an image having a high image density can be printed even when a small amount of the ink is used. The plastic deformation ratio of the composite particles is preferably at least twice the diameter of the composite particles in the ink before use for printing.

A polyester resin having a glass transition point of lower than 40° C. may soften to some extent in a room temperature environment. As a result, an image printed on a recording medium using the ink containing the composite particles has sliminess caused by the polyester resin, which leads to deterioration in touch. In addition, a polyester resin having a glass transition point of lower than 40° C. may cause a defect in a printed image.

On the other hand, a polyester resin having a glass transition point of higher than 70° C. has an increased hardness. As a result, an image printed on a recording medium using the ink containing the composite particles has stiffness caused by the polyester resin and deteriorated touch (for example, swelling resistance and resilience).

The polyester resin is preferably a non-crystalline polyester resin. A non-crystalline polyester resin has a glass transition point but does not have a definite melting point.

The polyester resin has a number average molecular weight of preferably at least 2,500 and no greater than 30,000, more preferably at least 4,000 and no greater than 30,000, and still more preferably at least 10,000 and no greater than 30,000. When the number average molecular weight of the polyester resin is at least 2,500, an ink film forming a printed image has an improved strength. When the number average molecular weight of the polyester resin is no greater than 30,000, a liquid containing the polyester resin does not have an excessively high viscosity at the time of preparation of composite particles. As a result, a uniform composite of the polyester resin and the basic dye can be formed.

In terms of easy formation of a composite with a basic dye, the polyester resin is preferably a linear polymer. However, the polyester resin may be crosslinked by a crosslinking agent having a functional group that contributes to dispersion stability of the composite particles in the ink.

(Basic Dye Forming Composite Particles)

A basic dye can form a printed image of which bleeding is inhibited and which has superior water resistance as compared to a direct dye and an acid dye. As already described, a basic dye has a basic group. The basic group (for example, an amino group) becomes a cationic group (for example, $-NH_4^+$) in an aqueous medium. Examples of the basic dye include C.I. Basic Yellow (1, 2, 3, 4, 11, 13, 14, 15, 19, 21, 28, 29, 32, 36, 40, 41, 45, 51, 63, 67, 70, or 73), C.I. Basic Orange (2, 21, 22, or 26), C.I. Basic Red (1, 2, 12, 13, 14, 15, 18, 22, 23, 24, 27, 29, 35, 36, 39, 46, 51, 69, 70, 73, or 82), C.I. Basic Violet (1, 3, 7, 10, 11, 15, 16, 20, 21, or 27), C.I. Basic Blue (1, 3, 5, 7, 9, 21, 26, 41, 45, 47, 54, 65, 69, 75, 77, 105, 117, 129, or 147), C.I. Basic Green (1 or 4), and C.I. Basic Brown 1.

The content ratio of the basic dye is preferably at least 0.01% by mass and no greater than 10.0% by mass relative to the mass of the ink, more preferably at least 0.01% by mass and no greater than 5.0% by mass, and still more preferably at least 0.1% by mass and no greater than 2.5% by mass.

<Aqueous Medium>

An aqueous medium is a medium containing water as a main component. The aqueous medium may function as a solvent or a dispersion medium. Specific examples of the aqueous medium include water and a liquid mixture of water and a polar solvent. Examples of the polar solvent contained in the aqueous medium include methanol, ethanol, isopropyl alcohol, butanol, and methyl ethyl ketone. The content ratio of the water in the aqueous medium is preferably at least 70% by mass, more preferably at least 80% by mass, and still more preferably at least 90% by mass. The aqueous medium is preferably water, and more preferably ion exchange water.

The content ratio of the aqueous medium is preferably at least 5% by mass and no greater than 99% by mass relative to the mass of the ink, and more preferably at least 50% by mass and no greater than 90% by mass. As a result of the content ratio of the aqueous medium being within such a range, an ink having an appropriate viscosity can be obtained.

<First Additive>

The ink preferably further contains a first additive as necessary. The first additive is a compound that is reactive with at least one of a hydroxyl group, a carboxy group, and an amino group by heating. The reaction as a result of heating is caused by for example heat treatment after image printing. The first additive functions for example as a fastness improver that improves fastness of a printed image.

The polyester resin contained in the composite particles has carboxy groups in addition to the sulfonic acid groups. Part of the carboxy groups of the polyester resin are bonded to the basic dye by ionic bonds. However, other part of the carboxy groups of the polyester resin remain in the composite particles without being bonded to the basic dye by ionic bonds. The "carboxy groups of the polyester resin remaining in the composite particles" may be referred to below as "remaining carboxy groups".

When the ink contains the first additive, heat treatment after image printing causes the following three reactions. The first reaction is a reaction of the remaining carboxy groups contained in the polyester resin in the composite particles with the first additive. The second reaction is a reaction of amino groups of the basic dye in the composite particles with the first additive. The third reaction is a reaction of hydroxyl groups and carboxy groups present on the surface of a recording medium with the first additive. Through these three reactions, the remaining carboxy groups of the polyester resin and the amino groups of the basic dye are bonded via the first additive. Thus, the polyester resin and the basic dye are firmly bonded to each other in each composite particle. In addition, the polyester resin in a composite particle and the basic dye in another composite particle are firmly bonded to each other. Further, through these three reactions, the remaining carboxy groups and the amino groups in the composite particles are bonded to the hydroxyl groups and the carboxy groups present on the surface of the recording medium via the first additive. Thus, the composite particles and the recording medium are firmly bonded to each other. As a result, the fastness to rubbing of a printed image can be further improved.

The heat treatment after image printing will be described. When a recording medium as used herein is a fiber product, the heat treatment temperature is preferably no higher than 180° C., and more preferably no higher than 160° C. The heat treatment temperature is preferably 100° C. or higher, and more preferably 130° C. or higher. When the heat treatment is performed at such a heat treatment temperature, the touch of the fiber product is not easily impaired. Examples of the heat treatment include press heat treatment and steam heat treatment. In order to improve fastness of a printed image, the printed image may be subjected to metal ion treatment, acid treatment, or alkali treatment.

Examples of the first additive include a blocked isocyanate, a polymer having an oxazoline group, a polycarbodiimide, and a compound having an epoxy group (for example, 1,3-bis(oxiranylmethoxy)propan-2-ol).

The content ratio of the first additive is preferably at least 0.1% by mass and no greater than 5.0% by mass relative to the mass of the ink.

<Second Additive>

The ink preferably further contains a second additive as necessary. The second additive is an ultraviolet absorber or an antioxidant. By using the ink containing the second additive, an image excellent in light resistance and heat resistance can be printed. In addition, as a result of the ink containing the second additive, impairment in touch of a printed image is inhibited.

Examples of the second additive include a salicylate-based compound, a benzophenone-based compound, a benzotriazole-based ultraviolet absorber (ultraviolet absorber having a benzotriazole structure), and a hydroxyphenyltriazine-based ultraviolet absorber (ultraviolet absorber having a hydroxyphenyltriazine structure). Examples of the salicylate-based compound include phenyl salicylate, monoglycol salicylate, and t-butylphenyl salicylate. Examples of the benzophenone-based compound include a 2-hydroxy-4-alkoxybenzophenone. Examples of the ultraviolet absorber having a benzotriazole structure include 2(2'-hydroxy-5'-methylphenyl)benzotriazole, 2(2'-hydroxy-5'-octylphenyl)benzotriazole, 2[2-hydroxy-3-(3,4,5,6-tetrahydrophthalimido-methyl)-5-methylphenyl]benzo triazole, 2[2'-hydroxy-3',5'-bis($\alpha,\alpha$'-dimethylbenzyl) phenyl]-2H-benzotriazole, 2(2'-hydroxy-3',5'-di-t-amylphenyl)benzotriazole, 2(2'-hydroxy-3',5'-di-t-butylphenyl)benzotriazole, 2(2'-hydroxy-3'-t-butyl-5'-methylphenyl)benzotriazole, and 2(2'-hydroxy-3'-t-butyl-5'-methylphenyl)-5-chlorobenzotriazole. As a second additive other than the above, resorcinol monobenzoate, 2'-ethylhexyl-2-cyano-3-phenylcinnamate, or bis (2,2,6,6-tetramethyl-4-piperidine) sebacate can also be used.

The second additive is preferably an ultraviolet absorber having a benzotriazole structure or an ultraviolet absorber having a hydroxyphenyltriazine structure. The content ratio of the second additive is preferably at least 0.1% by mass and no greater than 5.0% by mass relative to the mass of the ink.

<Surfactant>

Preferably, the ink further contains a surfactant as necessary. The ink can have excellent wettability to a recording medium as a result of containing a surfactant. Examples of the surfactant include anionic surfactants, cationic surfactants, nonionic surfactants, and zwitterionic surfactants. The ink may contain only one surfactant, or two or more (for example, two or three) surfactants.

The surfactant preferably includes at least a nonionic surfactant. As a result of the ink containing a nonionic surfactant, an ink having excellent dispersion stability of the composite particles can be obtained.

In order to obtain an ink having excellent dispersion stability of the composite particles, the surfactant more preferably includes a nonionic surfactant having a hydrophilic-lipophilic balance (HLB) value of at least 10.0 and no greater than 15.0. Examples of the nonionic surfactant having an HLB value of at least 10.0 and no greater than 15.0 include polyoxyethylene lauryl ether, polyoxyalkylene alkylphenyl ethers, and polyoxyethylene oleyl ether.

In order to obtain an ink having excellent dispersion stability of the composite particles, the surfactant still more preferably further includes a nonionic surfactant having an HLB value of at least 6.0 and less than 10.0 in addition to the nonionic surfactant having an HLB value of at least 10.0 and no greater than 15.0. Examples of the nonionic surfactant having an HLB value of at least 6.0 and less than 10.0 include a surfactant having an acetylene glycol structure (specific examples include acetylene diol ethylene oxide adduct).

The HLB value of a surfactant is calculated for example by the Griffin's method using a formula "HLB value=20× (sum of formula mass of hydrophilic portions)/molecular mass".

In order to obtain an ink having excellent dispersion stability of the composite particles, the surfactant preferably further includes an anionic surfactant in addition to the nonionic surfactant. Examples of the anionic surfactant include sodium salt of β-naphthalenesulfonic acid formalin condensate and sodium dodecylbenzenesulfonate.

The content ratio of the surfactant is preferably at least 0.01% by mass and no greater than 0.50% by mass relative to the mass of the ink. As a result of the content ratio of the surfactant being within such a range, an ink having excellent dispersion stability of the composite particles can be obtained. As a result of the content ratio of the surfactant being no greater than 0.50% by mass, bubbles are less likely to be generated from the ink in the nozzles of a recording head included in an inkjet recording apparatus, and the ink can be stably ejected from the nozzles. When the ink contains two or more surfactants, the "content ratio of the surfactant" indicates a total content ratio of the two or more surfactants.

<Moisturizing Agent>

The ink may contain a moisturizing agent as necessary. As a result of the ink containing a moisturizing agent, evaporation of the liquid component from the ink can be inhibited. Examples of the moisturizing agent include polyalkylene glycols, alkylene glycols, and glycerin. Examples of the polyalkylene glycols include polyethylene glycol and polypropylene glycol. Examples of the alkylene glycols include 3-methyl-1,5-pentanediol, ethylene glycol, propylene glycol, butylene glycol, diethylene glycol, dipropylene glycol, trimethylene glycol (that is, 1,3-propanediol), triethylene glycol, tripropylene glycol, 1,2,6-hexanetriol, thiodiglycol, 1,3-butanediol, and 1,5-pentanediol. The moisturizing agent is preferably at least one of alkylene glycols and glycerin, and more preferably at least one of 3-methyl-1,5-pentanediol and glycerin. The content ratio of the moisturizing agent is preferably at least 0.1% by mass and no greater than 10.0% by mass relative to the mass of the ink, and more preferably at least 0.1% by mass and no greater than 5.0% by mass.

<Other Components>

The ink may further contain other components (specific examples include a viscosity modifier, a solution stabilizer, and a penetrating agent) as necessary in addition to the components already described above. The ink preferably does not contain a pigment. The reason is that a pigment has a relatively large particle size, which tends to cause stiffness and lowered fastness to rubbing of a recording medium having a printed image thereon. Note that the recording medium may be subjected to pretreatment before an image is printed thereon using the ink. As a result of performing the pretreatment, bleeding of a printed image can be inhibited, and it is possible to print an image of which color developability and sharpness are high.

[Ink Production Method]

A method for producing the ink according to the present embodiment includes for example a polyester resin preparation process, a composite particle preparation process, and a mixing process.

<Polyester Resin Preparation Process>

In the polyester resin preparation process, a polyester resin having a sulfonic acid group is prepared. Specifically, in the polyester resin preparation process, a polyester resin is obtained by condensation polymerization of the first monomer, the second monomer, and the third monomer.

In the polyester resin preparation process, the first monomer in an amount (amount of substance) of at least 1.5 mol % and no greater than 20.0 mol % relative to the total amount (total amount of substance) of the first monomer and the second monomer is added. The "percentage of the first monomer relative to the total amount of the first monomer and the second monomer" may be referred to below as the "first monomer ratio". As a result of the first monomer ratio being within such a range, the first repeating unit ratio can be adjusted to at least 1.5 mol % and no greater than 20.0 mol %. In order to print an image having few image defects, excellent fastness to rubbing, and less impaired touch, the first repeating unit ratio is preferably at least 5.0 mol % and no greater than 20.0 mol %, and more preferably at least 5.0 mol % and no greater than 15.0 mol %.

In the polyester resin preparation process, it is preferable to add the first monomer in an amount of at least 3% by mass and no greater than 25% by mass relative to the total mass of the first monomer and the second monomer, and it is more preferable to add the first monomer in an amount of at least 3% by mass and no greater than 20% by mass. The glass transition point of the polyester resin obtained in the polyester resin preparation process is 40° C. or higher and 70° C. or lower.

The condensation polymerization may be carried out by a known method. Examples of the method for condensation polymerization include vacuum polymerization, reduced pressure polymerization, and acid chlorination. The reduced pressure polymerization tends to yield a polyester resin of a lower molecular weight as compared with that obtained by the vacuum polymerization.

The following describes an example of the method for condensation polymerization. The first monomer, the second monomer, and the third monomer are stirred in presence of a catalyst while reducing the pressure to a predetermined pressure. The first monomer, the second monomer, and the third monomer are subjected to condensation polymerization in this manner. Examples of the catalyst include zinc acetate and antimony trioxide. The predetermined pressure is preferably at least 1 mmHg and no greater than 10 mmHg. The temperature for condensation polymerization is preferably 130° C. or higher and 250° C. or lower. The time for condensation polymerization is preferably at least 0.5 hours and no longer than 10 hours, and more preferably at least 1 hour and no longer than 5 hours.

<Composite Particles Preparation Process>

In the composite particle preparation process, composite particles that are particles of a composite of a polyester resin and a basic dye are prepared. In the composite particle preparation process, the polyester resin at a mass ratio to the basic dye of at least 1.0 and no greater than 10.0 is added. As a result of adding the polyester resin at such a mass ratio, the resin/dye ratio can be adjusted to at least 1.0 and no greater than 10.0.

Subsequently, the polyester resin and the basic dye are mixed to obtain composite particles. The following describes an example of the method for preparing the composite particles. First, the polyester resin is dissolved in an aqueous medium to obtain a polyester resin solution. Also, the basic dye is dissolved in an aqueous medium to obtain a basic dye solution. As a result of mixing the polyester resin solution and the basic dye solution both obtained as above, the polyester resin and the basic dye form a composite, and thus, the composite particles are prepared. It is preferable to mix the basic dye solution and the polyester resin solution while the basic dye solution is dripped into the polyester resin solution. The temperature at the time of mixing is preferably 40° C. or higher and 90° C. or lower. The mixing speed is preferably at least 100 rpm and no greater than 500 rpm, and more preferably at least 200 rpm and no greater than 400 rpm. The mixing time is preferably at least 5 minutes and no longer than 1 hour.

Whether or not the basic dye has been introduced into the polyester resin can be confirmed by the following method. That is, a basic dye solution and a polyester resin solution are mixed to form composite particles, and then a liquid containing the composite particles is collected. The collected liquid is centrifuged at a rotational speed of 15,000 rpm for 30 minutes. After centrifugation, supernatant is collected. The basic dye contained in the supernatant is quantified by the absorbance method using a spectrophotometer (product of Hitachi, Ltd., for example). The amount of the basic dye contained in the supernatant corresponds to the amount of the basic dye not introduced into the polyester resin.

The following describes another example of the method for preparing the composite particles. First, the polyester resin and the basic dye are dissolved in an aqueous medium under heating to obtain a solution. The obtained solution is sprayed onto a water layer. When the sprayed solution reaches the water surface, composite particles are formed.

The following describes still another example of the method for preparing the composite particles. First, the polyester resin is dissolved in an aqueous medium to obtain a polyester resin solution. Also, the basic dye is dissolved in an aqueous medium to obtain a basic dye solution. The pH of the basic dye solution is adjusted to approximately 4. The basic dye solution of which the pH has been adjusted to approximately 4 is added to the polyester resin solution obtained as above to form a composite of the polyester resin and the basic dye. Thus, composite particles are prepared.

After preparation of the composite particles, it is preferable to wash the composite particles with water (for example, ion exchange water) until the specific conductivity of the composite particles becomes 30 µS/cm or lower. Examples of treatment for washing the composite particles include a washing treatment in which the composite particles obtained by the above mixing are dispersed in water (for example, ion exchange water) and then collected by filtration. The larger the number of times of the washing treatment, the lower the specific conductivity of the composite particles.

<Mixing Process>

In the mixing process, an aqueous medium and the composite particles are mixed. For example, a stirrer is used for the mixing. Ink component(s) added as necessary (specific examples include at least one of the first additive, the second additive, the surfactant, the moisturizing agent, and the other components) may be further added and then mixed. The resulting liquid mixture is filtered as necessary. As a result, the ink of the present embodiment is produced. Hereinbefore, a method for producing the ink of the present embodiment has been described.

EXAMPLES

The following describes Examples of the present disclosure. Note that in evaluations in which errors might occur, an evaluation value was calculated by obtaining an appropriate number of measured values and calculating the arithmetic mean of the measured values in order to ensure that any errors were sufficiently small.

[Polyester Resin Preparation Process]

First, polyester resins A to I (referred to below as resins A to I, respectively) were prepared. The compositions of the resins A to D are shown in Table 1, and the compositions of the resins E to I are shown in Table 2. The resins A to D were used for preparing composite particles to be contained in inks of Examples. The resins E to I were used for preparing composite particles to be contained in inks of Comparative Examples.

TABLE 1

|  |  |  | Resin A | Resin B | Resin C | Resin D |
|---|---|---|---|---|---|---|
| Second monomer | Terephthalic acid | Mass [g] | 50 | 50 | 35 | 50 |
|  |  | Amount of substance [mol] | 0.30 | 0.30 | 0.21 | 0.30 |
|  | Isophthalic acid | Mass [g] | 47 | 40 | 35 | 45 |
|  |  | Amount of substance [mol] | 0.28 | 0.24 | 0.21 | 0.27 |
|  | Naphthalenedicarboxylic acid | Mass [g] | 0 | 0 | 10 | 0 |
|  |  | Amount of substance [mol] | 0.00 | 0.00 | 0.05 | 0.00 |
| First monomer | Sodium-5-sulfoisophthalate | Mass [g] | 3 | 10 | 20 | 0 |
|  |  | Amount of substance [mol] | 0.01 | 0.04 | 0.07 | 0.00 |
|  | 4-Sulfophthalic acid | Mass [g] | 0 | 0 | 0 | 5 |
|  |  | Amount of substance [mol] | 0.00 | 0.00 | 0.00 | 0.02 |
| Third monomer | Ethylene glycol | Mass [g] | 30 | 30 | 30 | 30 |
|  |  | Amount of substance [mol] | 0.48 | 0.48 | 0.48 | 0.48 |
|  | Bisphenol A PO adduct | Mass [g] | 70 | 70 | 70 | 70 |
|  |  | Amount of substance [mol] | 0.20 | 0.20 | 0.20 | 0.20 |
|  | Diethylene glycol | Mass [g] | 0 | 0 | 0 | 0 |
|  |  | Amount of substance [mol] | 0.00 | 0.00 | 0.00 | 0.00 |
| First monomer ratio (First repeating unit ratio) [mol %] | | | 1.9 | 6.4 | 13.8 | 3.4 |
| Naphthalenedicarboxylic acid ratio [mol %] | | | 0.0 | 0.0 | 8.5 | 0.0 |
| Tg [° C.] | | | 44 | 50 | 65 | 45 |
| Number average molecular weight | | | 12700 | 16000 | 28000 | 13000 |

TABLE 2

|  |  |  | Resin E | Resin F | Resin G | Resin H | Resin I |
|---|---|---|---|---|---|---|---|
| Second monomer | Terephthalic acid | Mass [g] | 50 | 50 | 40 | 50 | 40 |
|  |  | Amount of substance [mol] | 0.30 | 0.30 | 0.24 | 0.30 | 0.24 |
|  | Isophthalic acid | Mass [g] | 50 | 47 | 37 | 47 | 30 |
|  |  | Amount of substance [mol] | 0.30 | 0.28 | 0.22 | 0.28 | 0.18 |
|  | Naphthalenedicarboxylic acid | Mass [g] | 0 | 0 | 20 | 0 | 0 |
|  |  | Amount of substance [mol] | 0.00 | 0.00 | 0.09 | 0.00 | 0.00 |
| First monomer | Sodium-5-sulfoisophthalate | Mass [g] | 0 | 3 | 3 | 3 | 20 |
|  |  | Amount of substance [mol] | 0.00 | 0.01 | 0.01 | 0.01 | 0.07 |
|  | 4-Sulfophthalic acid | Mass [g] | 0 | 0 | 0 | 0 | 10 |
|  |  | Amount of substance [mol] | 0.00 | 0.00 | 0.00 | 0.00 | 0.04 |
| Third monomer | Ethylene glycol | Mass [g] | 30 | 30 | 30 | 50 | 30 |
|  |  | Amount of substance [mol] | 0.48 | 0.48 | 0.48 | 0.81 | 0.48 |
|  | Bisphenol A PO adduct | Mass [g] | 70 | 50 | 70 | 0 | 70 |
|  |  | Amount of substance [mol] | 0.20 | 0.15 | 0.20 | 0.00 | 0.20 |
|  | Diethylene glycol | Mass [g] | 0 | 20 | 0 | 50 | 0 |
|  |  | Amount of substance [mol] | 0.00 | 0.19 | 0.00 | 0.47 | 0.00 |
| First monomer ratio (First repeating unit ratio) [mol %] | | | 0.0 | 1.9 | 2.0 | 1.9 | 21.5 |
| Naphthalenedicarboxylic acid ratio [mol %] | | | 0.0 | 0.0 | 16.3 | 0.0 | 0.0 |
| Tg [° C.] | | | 50 | 38 | 75 | 35 | 45 |
| Number average molecular weight | | | 17000 | 9200 | 35000 | 2400 | 13000 |

Terms in Tables 1 and 2 means as follows. "Tg" represents glass transition point. "Bisphenol A PO adduct" represents propylene oxide 2-mol adduct of bisphenol A. "Mass" represents mass (unit: g) of a corresponding monomer added. "Amount of substance" means a value obtained by converting the mass of a corresponding monomer added into an amount of substance (unit:mol) using the value of molar mass shown in Table 3. The conversion method will be described later with reference to Table 3.

"First monomer ratio" represents percentage (unit:mol %) of the first monomer added relative to the total amount of the first monomer and the second monomer added. The first monomer ratio is calculated using the formula "first monomer ratio=100×[(amount of substance of sodium-5- sulfoisophthalate)+(amount of substance of 4-sulfophthalic acid)]/[(amount of substance of sodium-5-sulfoisophthalate)+(amount of substance of 4-sulfophthalic acid)+(amount of substance of terephthalic acid)+(amount of substance of isophthalic acid)+(amount of substance of naphthalenedicarboxylic acid)]".

The amount of substance of a monomer before condensation polymerization reaction is equal to the amount of substance of the corresponding repeating unit after the condensation polymerization reaction. For this reason, the "first monomer ratio" corresponds to the "first repeating unit ratio".

"Naphthalenedicarboxylic acid ratio" represents content ratio (unit:mol %) of a repeating unit derived from naphthalenedicarboxylic acid relative to the total of the first repeating unit and the second repeating unit. The amount of substance of a monomer before condensation polymerization reaction is equal to the amount of substance of the corresponding repeating unit after the condensation polymerization reaction. For this reason, the content ratio of a repeating unit derived from naphthalene dicarboxylic acid is calculated using the formula "content ratio (unit:mol %) of repeating unit derived from naphthalenedicarboxylic acid=percentage (unit:mol %) of naphthalene dicarboxylic acid added relative to the total amount of the first monomer and the second monomer added=100×[(amount of substance of naphthalenedicarboxylic acid)/[(amount of substance of sodium-5-sulfoisophthalate)+(amount of substance of 4-sulfophthalic acid)+(amount of substance of terephthalic acid)+(amount of substance of isophthalic acid)+(amount of substance of naphthalenedicarboxylic acid)]". Hereinbefore, the meanings of the terms in Table 1 and Table 2 have been described.

The following describes a method for converting a mass of a corresponding monomer added into an amount of substance with reference to Table 3. Table 3 shows the molar masses of the monomers (unit: g/mol). An amount of substance of each monomer added was calculated using the formula "(amount of substance of monomer)=(mass of monomer added)/(molar mass of monomer)". The molar mass corresponds to molecular weight.

TABLE 3

| | Type | Molar mass [g/mol] |
|---|---|---|
| Second monomer | Terephthalic acid | 166 |
| | Isophthalic acid | 166 |
| | Naphthalenedicarboxylic acid | 216 |
| First monomer | Sodium-5-sulfoisophthalate | 268 |
| | 4-Sulfophthalic acid | 246 |
| Third monomer | Ethylene glycol | 62 |
| | Bisphenol A PO adduct | 344 |
| | Diethylene glycol | 106 |

<Preparation of Resin A>

A four-necked flask equipped with a fractionating column, a nitrogen inlet tube, a thermometer, and a stirrer was prepared. The flask was charged with terephthalic acid (50 g), sodium-5-sulfoisophthalate (3 g), ethylene glycol (30 g), propylene oxide 2-mol adduct of bisphenol A (70 g), and zinc acetate (0.1 g) as a catalyst. The temperature of the flask contents was increased from 130° C. to 170° C. over 2 hours. Subsequently, isophthalic acid (47 g) and antimony trioxide (0.1 g) were added into the flask. The temperature of the flask contents was increased from 170° C. to 200° C. over 2 hours. Subsequently, the temperature of the flask contents was gradually increased from 200° C. to 250° C. while the pressure inside the flask was gradually reduced from atmospheric pressure to 5 mmHg. By subjecting the flask contents to a condensation polymerization reaction under conditions of 250° C. and 5 mmHg for 1 hour, a resin A was obtained. The glass transition point of the resin A is shown in Table 1. The resin A had a glass transition point but did not have a definite melting point, whereby the resin A was confirmed to be a non-crystalline polyester resin.

<Preparation of Resins B to I>

Each of resins B to I was prepared by the same method as that for preparation of the resin A in all aspects other than that the types and amounts of monomers used were as shown in Tables 1 and 2. The glass transition points of the resins B to I are shown in Tables 1 and 2. The resins B to I each had a glass transition point but did not have a definite melting point, whereby the resins B to I were each confirmed to be a non-crystalline polyester resin.

[Composite Particles Preparation Process]

Next, composite particles (C-a) to (C-l) were prepared. The compositions of the composite particles (C-a) to (C-l) are shown in Table 4. The composite particles (C-a) to (C-e) were used for preparation of dispersions contained in inks of Examples. The composite particles (C-f) to (C-l) were used for preparation of dispersions contained in inks of Comparative Examples.

TABLE 4

| Composite particles | Resin Type | Resin Amount [Parts] | Dye Type | Dye Amount [Parts] | Resin/Dye | Conductivity [μS/cm] |
|---|---|---|---|---|---|---|
| C-a | A | 15 | B.Y.28 | 2 | 7.5 | 15 |
| C-b | A | 15 | B.R.29 | 2 | 7.5 | 6 |
| C-c | B | 10 | B.Y.28 | 2 | 5.0 | 8 |
| C-d | C | 5 | B.Y.28 | 2 | 2.5 | 17 |
| C-e | D | 15 | B.B.41 | 2 | 7.5 | 7 |
| C-f | A | 1 | B.Y.28 | 2 | 0.5 | Impossible to prepare composite particles |
| C-g | A | 32 | B.Y.28 | 2 | 16.0 | 14 |
| C-h | F | 15 | B.Y.28 | 2 | 7.5 | 15 |
| C-i | G | 15 | B.Y.28 | 2 | 7.5 | 15 |
| C-j | H | 15 | B.Y.28 | 2 | 7.5 | 15 |
| C-k | I | 15 | B.Y.28 | 2 | 7.5 | 15 |
| C-l | E | 15 | B.Y.28 | 2 | 7.5 | Impossible to prepare composite particles |

The following describes meanings of terms in Table 4. "Parts" represents parts by mass. "Dye" represents "basic dye". "B.Y.28", "B.R.29", and "B.B.41" are as follows, and all are basic dyes.

B.Y.28: C.I. Basic Yellow 28
B.R.29: C.I. Basic Red 29
B.B.41: C.I. Basic Blue 41

"Resin/dye" represents a resin/dye ratio. "Conductivity" represents a specific conductivity (unit: μS/cm). The method for measuring the specific conductivity will be described later in <Method for Measuring Specific Conductivity>. Hereinbefore, the meanings of the terms in Table 4 have been described.

<Preparation of Composite Particles (C-a)>

A three-necked flask was charged with the resin A (15 parts by mass) and water (200 parts by mass). The flask contents were stirred at a stirring rate of 300 rpm at a temperature of 80° C. for 30 minutes to dissolve the resin A in water. An aqueous solution S1 of the resin A was obtained in this manner.

Another three-necked flask was charged with C.I. Basic Yellow 28 as a basic dye (2 parts by mass), water (150 parts by mass), and a 10% acetic acid aqueous solution (0.1 parts by mass). The flask contents were stirred at a stirring rate of 300 rpm at a temperature of 65° C. for 30 minutes to obtain an aqueous solution S2 of the basic dye.

While the aqueous solution S1 of the resin A was stirred, the aqueous solution S2 of the basic dye was dripped into the aqueous solution S1. The stirring rate of the aqueous solution S1 at the time of dripping was 300 rpm. The dripping rate of the aqueous solution S2 was 0.15 L/hour. The flask contents were stirred for 60 minutes after the dripping was completed. A dispersion of composite particles (C-a) that were composite particles of the resin A and C.I. basic yellow 28 was obtained in this manner. A wet cake of the composite particles (C-a) was collected by filtration using a Buchner funnel.

Subsequently, the wet cake of the composite particles (C-a) was washed. Specifically, a washing treatment was performed by redispersing the wet cake of the composite particles (C-a) in ion exchange water, followed by filtration using a Buchner funnel to collect a wet cake of the composite particles (C-a). The washing treatment was repeated until the specific conductivity of the composite particles (C-a) as measured by a method described later in <Method for Measuring Specific Conductivity> became the value shown in Table 4.

After the washing treatment, the wet cake of the composite particles (C-a) were dried using a continuous type surface modifier ("COATMIZER (registered Japanese trademark)", product of Freund Corporation). The drying conditions of the COATMIZER included a hot air temperature of 45° C. and a blower flow rate of 2 m³/min. The composite particles (C-a) were obtained in this manner.

<Preparation of Composite Particles (C-b) to (C-e) and (C-g) to (C-k)>

Each type of the composite particles (C-b) to (C-e) and (C-g) to (C-k) was prepared by the same method as that for preparation of the composite particles (C-a) in all aspects other than that the type and amount of the resin and the basic dye used were as shown in Table 4 and that the washing treatment was repeated until the specific conductivity became the value shown in Table 4.

<Attempt on Preparation of Composite Particles (C-f)>

Preparation of the composite particles (C-f) was attempted by the same method as that for preparation of the composite particles (C-a) in all aspects other than that the resin A (15 g) was changed to the resin A (1 g), which means that the resin/dye ratio was changed to 0.5. However, it was impossible to prepare composite particles (C-f) having a resin/dye ratio of 0.5 because part of the basic dye remained in the aqueous solution without being introduced into composite particles although the composite particles were formed in terms of shape. For this reason, preparation work after preparation described below in [Preparation of Dispersion of Composite Particles] was not performed on the composite particles (C-f).

<Attempt on Preparation of Composite Particles (C-l)>

Preparation of composite particles (C-l) was attempted by the same method as that for preparation of the composite particles (C-a) in all aspects other than that the resin A was changed to the resin E. However, it was impossible to prepare the composite particles (C-l) because the resin E was not dissolved in water, resulting in unsuccessful uniform formation of a composite. For this reason, preparation work after preparation described below in [Preparation of Dispersion of Composite Particles] was not performed on the composite particles (C-l).

[Preparation of Dispersions of Composite Particles]

Next, composite particle dispersions (D-1) to (D-14) (referred to below as dispersions (D-1) to (D-14), respectively) were prepared. The compositions of the dispersions (D-1) to (D-14) are shown in Table 5. The dispersions (D-1) to (D-9) were used for preparation of inks of Examples. The dispersions (D-10) to (D-14) were used for preparation of inks of Comparative Examples.

TABLE 5

| Dispersion | Composite particles Type | Surfactant Type | Amount [Parts] |
|---|---|---|---|
| D-1 | C-a | EMULGEN 106 | 0.5 |
| D-2 | C-a | EMULGEN 106 | 0.5 |
|  |  | DBS | 0.2 |
| D-3 | C-a | NEWCOL 564 | 0.5 |
| D-4 | C-a | EMULGEN 420 | 0.5 |
|  |  | EMULGEN 106 | 0.5 |
| D-5 | C-a | EMULGEN 420 | 0.5 |
|  |  | DEMOL N | 0.3 |
| D-6 | C-b | EMULGEN 106 | 0.5 |
| D-7 | C-c | EMULGEN 106 | 0.5 |
|  |  | DBS | 0.2 |
| D-8 | C-d | EMULGEN 420 | 0.5 |
|  |  | EMULGEN 106 | 0.5 |
| D-9 | C-e | EMULGEN 106 | 0.5 |
|  |  | DBS | 0.2 |
| D-11 | C-g | EMULGEN 106 | 0.5 |
|  |  | DEMOL N | 0.2 |
| D-12 | C-h | EMULGEN 106 | 0.5 |
| D-13 | C-i | EMULGEN 106 | 0.5 |
|  |  | DBS | 0.2 |
| D-14 | C-j | EMULGEN 106 | 0.5 |
|  |  | DBS | 0.2 |
| D-10 | C-k | EMULGEN 106 | 0.5 |
|  |  | DBS | 0.2 |

"Parts" in table 5 represents parts by mass. "DBS" in Table 5 represents sodium dodecylbenzene sulfonate. Details of the surfactants shown in Table 5 are shown in Table 6. Note that "EMULGEN" and "NEWCOL" are registered Japanese trademarks.

TABLE 6

| Surfactant | Polarity | HLB | Component | Manufacturer |
|---|---|---|---|---|
| EMULGEN 106 | Nonionic | 10.5 | Polyoxyethylene lauryl ether | Kao Corporation |
| NEWCOL 564 | Nonionic | 12.3 | Polyoxyalkylene alkylphenyl ether | Nippon Nyukazai Co., Ltd. |
| EMULGEN 420 | Nonionic | 13.6 | Polyoxyethylene oleyl ether | Kao Corporation |
| DEMOL N | Anionic | — | Sodium β-naphthalene sulfonate formaldehyde condensates | Kao Corporation |
| DBS | Anionic | — | Sodium dodecylbenzene sulfonate | FUJIFILM Wako Pure Chemical Corporation |

<Preparation of Dispersion (D-1)>

A three-necked flask was charged with the composite particles (C-a) (10 parts by mass) and methyl ethyl ketone (70 parts by mass), and the flask contents were stirred at 60° C. for 30 minutes. Subsequently, EMULGEN 106 (0.5 parts by mass) was added into the flask. A 10% diisopropylamine aqueous solution (10 parts by mass) was dripped at a dripping rate of 0.3 L/h. Next, water (180 parts by mass) was dripped at a dripping rate of 0.3 L/hour. The flask contents were stirred for 2 hours after the dripping was completed. After the stirring, the liquid in the flask was cooled and then taken out. The liquid taken out of the flask was subjected to evaporation under reduced pressure at a temperature of 53° C. for 30 minutes using an evaporator to remove methyl ethyl ketone from the liquid. The dispersion (D-1) of the composite particles (C-a) was obtained in this manner.

<Preparation of Dispersions (D-2) to (D-14)>

The dispersions (D-2) to (D-14) were prepared by the same method as that for preparation of the dispersion (D-1) in all aspects other than that the types of the composite particles shown in Table 5 were used and that the type(s) and amount(s) of the surfactant(s) shown in Table 5 were used.

[Preparation of Ink]

Next, inks (I-A1) to (I-A16) of Examples and inks (I-B1) to (I-B5) of Comparative Examples were prepared. The compositions of the inks (I-A1) to (I-A16) and the inks (I-B1) to (I-B5) are shown in Table 7. Although the ink (I-A1) and the ink (I-A4) have the same composition, these are labeled with ink numbers different from each other in order to facilitate explanation. This is because these are different in performance or non-performance of cloth pretreatment described below in [Evaluation Method].

TABLE 7

| | | | Additive | | | Temperature of heat treatment |
| --- | --- | --- | --- | --- | --- | --- |
| | Ink | Dispersion Type | Type | Amount [g] | Cloth pretreatment | after printing [° C.] |
| Example 1 | I-A1 | D-1 | — | — | Not performed | 150 |
| Example 2 | I-A2 | D-2 | ADD-1 | 0.05 | Not performed | 150 |
| Example 3 | I-A3 | D-2 | ADD-2 | 0.05 | Not performed | 150 |
| Example 4 | I-A4 | D-1 | — | — | Performed | 150 |
| Example 5 | I-A5 | D-3 | — | — | Not performed | 150 |
| Example 6 | I-A6 | D-1 | ADD-3 | 0.10 | Not performed | 150 |
| Example 7 | I-A7 | D-2 | ADD-4 | 0.20 | Not performed | 150 |
| Example 8 | I-A8 | D-3 | ADD-5 | 0.20 | Not performed | 150 |
| Example 9 | I-A9 | D-2 | ADD-3 | 0.20 | Not performed | 150 |
| Example 10 | I-A10 | D-2 | ADD-6 | 0.10 | Not performed | 150 |
| Example 11 | I-A11 | D-4 | — | — | Not performed | 150 |
| Example 12 | I-A12 | D-5 | — | — | Not performed | 150 |
| Example 13 | I-A13 | D-6 | — | — | Not performed | 150 |
| Example 14 | I-A14 | D-7 | — | — | Not performed | 150 |
| Example 15 | I-A15 | D-8 | — | — | Not performed | 150 |
| Example 16 | I-A16 | D-9 | — | — | Not performed | 150 |
| Comparative Example 1 | I-B1 | D-10 | — | — | Not performed | 150 |
| Comparative Example 2 | I-B2 | D-11 | — | — | Not performed | 150 |
| Comparative Example 3 | I-B3 | D-12 | — | — | Not performed | 150 |
| Comparative Example 4 | I-B4 | D-13 | — | — | Not performed | 150 |
| Comparative Example 5 | I-B5 | D-14 | — | — | Not performed | 150 |

The following describes meanings of terms in Table 7. "-" represents that a corresponding component was not added. In the column of "Cloth pretreatment", "Performed" represents that the pretreatment in <Cloth Pretreatment> described below was performed, and "Not performed" represents that the pretreatment was not performed. "Temperature of heat treatment after printing" represents heating temperature in the heat treatment in <Heat Treatment after Printing> described below.

Details of the additives shown in Table 7 are as follows.
ADD-1: UV absorber having a benzotriazole structure, "TINUVIN (registered Japanese trademark) 9945-DW", product of BASF Japan Ltd., active ingredient concentration 45% by mass
ADD-2: UV absorber having a hydroxyphenyltriazine structure, "TINUVIN (registered Japanese trademark) 477-DW", product of BASF Japan Ltd., active ingredient concentration 20% by mass
ADD-3: Blocked isocyanate, "MEIKANATE CX", product of Meisei Chemical Works, Ltd.
ADD-4: Oxazoline group-containing polymer, "EPOCROS (registered Japanese trademark) K-2030", product of Nippon Shokubai Co., Ltd., active ingredient concentration 40% by mass
ADD-5: Polycarbodiimide resin, "V-02", product of Nisshinbo Chemical Inc., active ingredient concentration 40% by mass
ADD-6: 1,3-bis(oxiranylmethoxy)propan-2-ol, "DENACOL (registered trademark) EX-313", product of Nagase Chemtex Corporation Hereinbefore, the meanings of the terms in Table7 have been described.

<Preparation of Ink (I-A1)>

Dispersion (D-1) (5 g), glycerin (0.044 g), propylene glycol (0.044 g), a nonionic surfactant ("SURFYNOL (registered Japanese trademark) 440", product of Nisshin Chemical Co., Ltd.), acetylene glycol ethylene oxide adduct, HLB value: 8, 0.028 g), and ion exchange water (0.439 g) were stirred together with a stirrer at 20° C. for 15 minutes to obtain a liquid. The obtained liquid was filtered using a membrane filter (average pore size: 1.0 μm) to obtain the ink (I-A1).

<Preparation of Ink (I-A4)>

As described above, since the ink (I-A1) and the ink (I-A4) have the same composition, the obtained ink (I-A1) was used also as the ink (I-A4).

<Preparation of Inks (I-A5), (I-A11) to (I-A16), and (I-B1) to (I-B5)>

Each of the inks (I-A5), (I-A11) to (I-A16), and (I-B1) to (I-B5) was obtained by the same method as that for preparation of the ink (I-A1) in all aspects other than that the type of the dispersion shown in Table 7 was used.

<Preparation of Inks (I-A2), (I-A3), and (I-A6) to (I-A10)>

Each of the inks (I-A2), (I-A3), and (I-A6) to (I-A10) was obtained by the same method as that for preparation of the ink (I-A1) in all aspects other than that the type of the dispersion shown in Table 7 was used and that the type of the additive shown in Table 7 was further added in the amount shown in Table 7.

[Measurement Method]

<Method for Measuring Glass Transition Point>

A glass transition point (Tg) was measured for each of the resins A to I in accordance with "Japanese Industrial Standards (JIS) K7121-2012" using a differential scanning calorimeter ("DSC-6220", product of Seiko Instruments Inc.).

<Method for Measuring Number Average Molecular Weight>

A number average molecular weight was measured for each of the resins A to I using a gel permeation chromatography (GPC). The preparation conditions and the GPC measurement conditions of measurement samples were as shown below.
(Preparation Conditions of Measurement Samples)
Eluent: tetrahydrofuran (THF)
Solution concentration: 3.0 mg/mL
Pretreatment: filtration through a filter having a pore size of 0.45 μm
Injection amount: 100 μL
(GPC Measurement Conditions)
Apparatus: HLC-8220GPC (product of Tosoh Corporation)
Column: TSKgel GMHXL-L (product of Tosoh Corporation)
Number of columns: 2 (serial connection)
Column temperature: 40° C.
Carrier solvent: tetrahydrofuran (THF)
Carrier flow rate: 1 mL/min
Detector: refraction index (RI) detector
Calibration curve: calibration curve plotted using standard polystyrene <Method for Measuring Specific Conductivity>

A specific conductivity of the composite particles (C-a) was measured by the method described below. The measurement environment for the specific conductivity was an environment at a temperature of 25° C. and a relative humidity of 60%. A wet cake of the composite particles (C-a) obtained after the washing treatment described above in <Preparation of Composite Particles (C-a)> were diluted with ion exchange water so that the solid concentration would be 10% by mass (i.e. concentration of composite particles would be 10% by mass) to obtain a measurement liquid. Subsequently, dispersion treatment was performed on the measurement liquid using an ultrasonic disperser ("ULTRASNIC MINI WELDER P128", product of Ultrasonic Engineering Co., Ltd.) for 5 minutes. After the dispersion treatment, the conductivity of the measurement liquid was measured using a portable conductivity meter ("D-74", product of Horiba Ltd.).

A specific conductivity of each type of composite particles (C-b) to (C-e) and (C-g) to (C-k) was measured by the same method as that for measuring the specific conductivity of the composite particles (C-a) in all aspects other than that the composite particles (C-a) were changed to each type of the composite particles (C-b) to (C-e) and (C-g) to (C-k). For each type of the composite particles (C-f) and (C-l), it was impossible to prepare desired composite particles as described above, and therefore, measurement of the specific conductivity was not performed.

[Evaluation Method]

An image was printed on a cloth using one of the inks (I-A1) to (I-A16) and (I-B1) to (I-B5) that each are an evaluation target, and the printed image was evaluated. Specifically, printing on a piece of cloth using an inkjet recording apparatus followed by heat treatment was performed using one of inks (I-A1) to (I-A16) and (I-B1) to (I-B5) as shown below. Pretreatment of a piece of cloth was performed for the ink (I-A4) as described below before the printing on the piece of cloth.

<Printing on Cloth Using Inkjet Recording Apparatus>

Printing was performed using an inkjet recording apparatus (an inkjet printer, "COLORIO PRINTER PX-045A", product of Seiko Epson Corp.). The evaluation target ink was loaded into an ink cartridge for a color that corresponds to the color of the evaluation target ink, and the ink cartridge was set in the inkjet recording apparatus. Next, an image (a solid image at a printing rate of 100%) was printed on a piece of cloth (polyester cloth, "Tropical", product of Teijin Limited) using the inkjet recording apparatus. The cloth with the image printed thereon was dried at 20° C. for 12 hours.

<Heat Treatment after Printing>

Heat treatment was performed on the piece of cloth with the image printed thereon using a press machine ("TABLE-TOP AUTOMATIC FLAT PRESS MACHINE AF-54TEN", product of Asahi Garment Machinery Co., Ltd.) under the conditions of the temperature shown in Table 7, a pressure of 0.20 N/cm$^2$, and a processing time of 60 seconds. The cloth after the heat treatment was used as an evaluation cloth.

<Cloth Pretreatment>

Cloth retreatment was performed before the printing only when the ink (I-A4) was used. Specifically, a pretreatment liquid having the composition shown below was applied to a piece of cloth by the padding method. Subsequently, the piece of cloth was dried so that the drying rate would be 50% to obtain a pretreated cloth. The drying rate was calculated based on respective masses of the cloth at a drying rate of 0% and a drying rate of 100%. Here, the cloth at a drying rate of 0% is that after the application of the pretreatment liquid by the padding method, and the cloth at a drying rate of 100% is that before the application of the pretreatment liquid by the padding method.

(Composition of Pretreatment Liquid)
Polyallylamine ("PAA (registered Japanese trademark)-HCL-3A", product of
Nittobo Medical Co., Ltd.): 50 parts by mass
Glycerin: 80 parts by mass
1,2-hexanediol: 20 parts by mass
Polyether modified polydimethylsiloxane ("BYK348", product of BYK Japan KK): 10 parts by mass
Water: 840 parts by mass <Image Evaluation>

Loupe observation and visual observation were performed on the evaluation cloth obtained as described above in <Heat Treatment after Printing>. Through each observation, the presence or absence of image defects in the image on the evaluation cloth was examined. Specifically, image streaks and density unevenness as image defects were checked. Image streaks are caused by nozzle clogging and irregular ink ejection from a nozzle. Based on the results of checking on the presence or absence of image defects, the evaluation cloth was evaluated in accordance with the following criteria. The image evaluation results are shown in Table 8.

(Image Evaluation Criteria)
Evaluation 5: No image defects are observed by either loupe observation or visual observation.
Evaluation 4: Some image defects are observed by loupe observation, but no image defects are observed by visual observation.
Evaluation 3: Image defects are clearly observed by loupe observation, but no image defects are observed by visual observation.
Evaluation 2: Image defects are clearly observed by loupe observation, and some image defects are observed by visual observation.
Evaluation 1: Image defects are clearly observed by both loupe observation and visual observation.

<Evaluation of Fastness to Rubbing>

A fastness to rubbing of the evaluation cloth obtained in <Heat Treatment after Printing> described above was measured in accordance with a wet testing method (Type II) defined by Japan Society for the Promotion of Science prescribed in Japanese Industrial Standards (JIS) L-0849 (Test methods for color fastness to rubbing). "Criteria for discoloration and fading" prescribed in Clause 10 (Assessment of color fastness) of JIS L-0801 (General principles of testing methods for color fastness) cited in JIS L-0849 were adopted as determination criteria for the fastness to rubbing. The criteria are based on the following discoloration and fading grades: Grade 1, Grade 1-2 (i.e., higher than Grade 1 and lower than Grade 2), Grade 2, Grade 2-3 (i.e., higher than Grade 2 and lower than Grade 3), Grade 3, Grade 3-4 (i.e., higher than Grade 3 and lower than Grade 4), Grade 4, Grade 4-5 (i.e., higher than Grade 4 and lower than Grade 5), and Grade 5. The larger (the closer to Grade 5) the value of the discoloration and fading grade, the superior the fastness to rubbing. Table 8 shows evaluation results of fastness to rubbing of the evaluation cloths.

<Evaluation of Touch>

A touch of the evaluation cloth was evaluated by hand touching the evaluation cloth obtained as described above in <Heat Treatment after Printing> with a hand. For the evaluation of touch, three items, that is, resilience, sliminess, and swelling resistance of the evaluation cloth were each evaluated in three grades of A (good), B (mediocre), and C (poor). The smaller the swelling of the evaluation cloth was, the better the item of swelling resistance was evaluated. The touch of the evaluation cloth was evaluated in accordance with the following criteria. Table 8 shows evaluation results of touch of the evaluation cloths.

(Touch Evaluation Criteria)
Evaluation 5: Out of three evaluation items, three are A.
Evaluation 4: Out of three evaluation items, two are A and there are no C.
Evaluation 3: Out of three evaluation items, one is A and there are no C.
Evaluation 2: Out of three evaluation items, one or two are C and there are no A.
Evaluation 1: Out of three evaluation items, three are C and there are no A.

TABLE 8

| | Ink | Image Evaluation | Fastness to rubbing [Grade] | Touch |
| --- | --- | --- | --- | --- |
| Example 1 | I-A1 | 3 | 3 < Grade < 4 | 4 |
| Example 2 | I-A2 | 4 | 3 < Grade < 4 | 4 |
| Example 3 | I-A3 | 3 | 3 < Grade < 4 | 4 |
| Example 4 | I-A4 | 5 | 3 < Grade < 4 | 3 |
| Example 5 | I-A5 | 4 | 3 < Grade < 4 | 4 |
| Example 6 | I-A6 | 4 | 4 | 3 |
| Example 7 | I-A7 | 3 | 4 | 3 |
| Example 8 | I-A8 | 4 | 4 | 3 |
| Example 9 | I-A9 | 3 | 5 | 3 |
| Example 10 | I-A10 | 4 | 4 | 3 |
| Example 11 | I-A11 | 3 | 3 < Grade < 4 | 4 |
| Example 12 | I-A12 | 4 | 3 < Grade < 4 | 4 |
| Example 13 | I-A13 | 3 | 3 < Grade < 4 | 4 |
| Example 14 | I-A14 | 4 | 3 | 4 |
| Example 15 | I-A15 | 3 | 3 | 4 |
| Example 16 | I-A16 | 4 | 3 < Grade < 4 | 4 |
| Comparative Example 1 | I-B1 | 3 | 1 < Grade < 2 | 3 |
| Comparative Example 2 | I-B2 | 2 | 2 | 2 |
| Comparative Example 3 | I-B3 | 3 | 3 < Grade < 4 | 2 |
| Comparative Example 4 | I-B4 | 3 | 3 < Grade < 4 | 2 |
| Comparative Example 5 | I-B5 | 2 | 3 | 2 |

As shown in Tables 7 and 5, the inks (I-A1) to (I-A16) each contained composite particles (specifically, one of the composite particles (C-a) to (C-e)). As shown in Table 4, the composite particles (C-a) to (C-e) are particles of a composite of a polyester resin having a sulfonic acid group (specifically, one of resins A to D) and a basic dye. As shown in the column entitled "Tg" in Table 1, each of the resins A to D had a glass transition point of 40° C. or higher and 70° C. or lower. As shown in Table 1, each of the resins A to D included the first repeating unit derived from the first monomer, the second repeating unit derived from the second monomer, and the third repeating unit derived from the third monomer. As shown in the column entitled "First repeating unit ratio" in Table 1, the resins A to D each had a first repeating unit ratio of at least 1.5 mol % and no greater than 20.0 mol %. As shown in the column entitled "Resin/dye" in Table 4, each type of the composite particles (C-a) to (C-e) had a resin/dye ratio of at least 1.0 and no greater than 10.0.

As shown in Table 8, each of the evaluation cloths having thereon an image printed using a corresponding one of the inks (I-A1) to (I-A16) was rated as 3 or higher in the image evaluation, rated as Grade 3 or higher in the fastness to rubbing, and rated as 3 or higher in the touch evaluation. As a result, when any of the inks (I-A1) to (I-A16) was used, it was possible to print an image having few image defects, excellent fastness to rubbing, and less impaired touch.

By contrast, as shown in Tables 7 and 5, the ink (I-B1) contained the composite particles (C-k). As shown in Table 4, the composite particles (C-k) contained the resin I. As shown in the column entitled "First repeating unit ratio" in Table 2, the resin I included a first repeating unit ratio of greater than 20.0 mol %. As a result, as shown in Table 8, an image printed using the ink (I-B1) had a fastness to rubbing of higher than Grade 1 and lower than Grade 2, which means poor in fastness to rubbing.

As shown in Tables 7 and 5, the ink (I-B2) contained the composite particles (C-g). As shown in the column entitled "Resin/dye" in Table 4, the composite particles (C-g) had a resin/dye ratio of greater than 10.0. As a result, as shown in Table 8, an image printed using the ink (I-B2) was rated as 2 in the image evaluation, rated as Grade 2 in the fastness to rubbing, and rated as 2 in the touch evaluation. When an image was printed using the ink (I-B2), occurrence of image defects was not inhibited, the image fastness to rubbing was poor, and impairment in touch was not inhibited.

As shown in Tables 7 and 5, the ink (I-B3) contained the composite particles (C-h). As shown in Table 4, the composite particles (C-h) contained the resin F. As shown in the column entitled "Tg" in Table 2, the resin F had a glass transition point of lower than 40° C. As a result, as shown in Table 8, an image printed using the ink (I-B3) was rated as 2 in the touch evaluation. That is, impairment in touch was not inhibited.

As shown in Tables 7 and 5, the ink (I-B4) contained the composite particles (C-i). As shown in Table 4, the composite particles (C-i) contained the resin G. As shown in the column entitled "Tg" in Table 2, the resin G had a glass transition point of higher than 70° C. As a result, as shown in Table 8, an image printed using the ink (I-B4) was rated as 2 in the touch evaluation. That is, impairment in touch was not inhibited.

As shown in Tables 7 and 5, the ink (I-B5) contained the composite particles (C-j). As shown in Table 4, the composite particles (C-j) contained the resin H. As shown in the column entitled "Tg" in Table 2, the resin H had a glass transition point of lower than 40° C. As a result, as shown in Table 8, an image printed using the ink (I-B5) was rated as 2 in the image evaluation, and rated as 2 in the touch evaluation. As a result, when an image was printed using the ink (I-B5), occurrence of image defects was not inhibited, and impairment in touch was not inhibited.

As shown in Table 2, the resin E did not include the first repeating unit derived from the first monomer. As a result, the resin E was not dissolved in water, leading to unsuccessful preparation of the composite particles (C-l) as shown in Table 4.

From all the above, it was shown that the ink according to the present disclosure can be used to print an image with few image defects, excellent fastness to rubbing, and less impaired touch.

What is claimed is:

1. An inkjet ink comprising:
an aqueous medium; and
composite particles, wherein
the composite particles are particles of a composite of a polyester resin having a sulfonic acid group and a basic dye,
the polyester resin has a glass transition point of 40° C. or higher and 70° C. or lower,
the polyester resin includes:
a first repeating unit derived from a polyvalent carboxylic acid having the sulfonic acid group;
a second repeating unit derived from a polyvalent carboxylic acid having no sulfonic acid group; and
a third repeating unit derived from a polyhydric alcohol,
the polyester resin has a content ratio of the first repeating unit relative to a total amount of the first repeating unit and the second repeating unit of at least 1.5 mol % and no greater than 20.0 mol %,
the second repeating unit includes a repeating unit derived from terephthalic acid, a repeating unit derived from isophthalic acid, and a repeating unit derived from naphthalenedicarboxylic acid,
a content ratio of the repeating unit derived from naphthalenedicarboxylic acid relative to the total amount of the first repeating unit and the second repeating unit is greater than 0.0 mol % and no greater than 10.0 mol %, and
a mass ratio of the polyester resin to the basic dye is at least 1.0 and no greater than 10.0.

2. An inkjet ink comprising:
an aqueous medium; and
composite particles, wherein
the composite particles are particles of a composite of a polyester resin having a sulfonic acid group and a basic dye,
the polyester resin has a glass transition point of 40° C. or higher and 70° C. or lower,
the polyester resin includes:
a first repeating unit derived from a polyvalent carboxylic acid having the sulfonic acid group;
a second repeating unit derived from a polyvalent carboxylic acid having no sulfonic acid group; and
a third repeating unit derived from a polyhydric alcohol,
the polyester resin has a content ratio of the first repeating unit relative to a total amount of the first repeating unit and the second repeating unit of at least 1.5 mol % and no greater than 20.0 mol %,
a mass ratio of the polyester resin to the basic dye is at least 1.0 and no greater than 10.0, the inkjet ink further comprising a first additive that is a compound reactive with at least one of a hydroxyl group, a carboxy group, and an amino group by heating, and the first additive is a blocked isocyanate, a polymer having an oxazoline group, a polycarbodiimide, or a compound having an epoxy group.

\* \* \* \* \*